J. E. COLAS.
ELECTRIC SIGNALING APPARATUS FOR RAILWAYS.
APPLICATION FILED DEC. 5, 1913.
1,233,029.
Patented July 10, 1917.
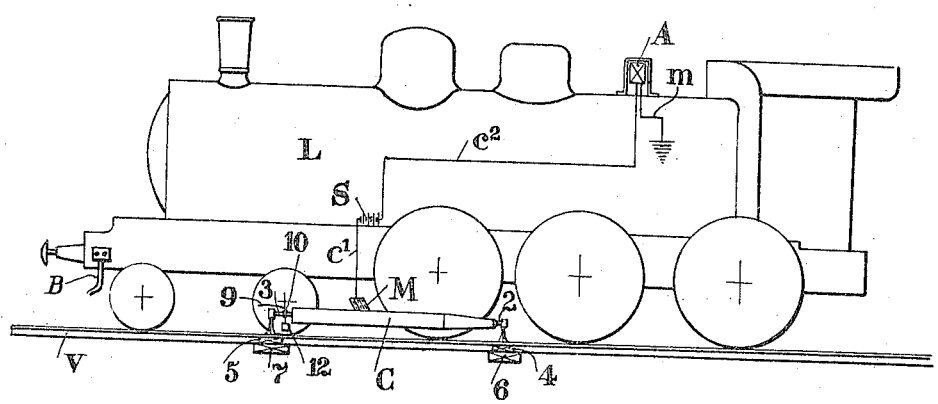
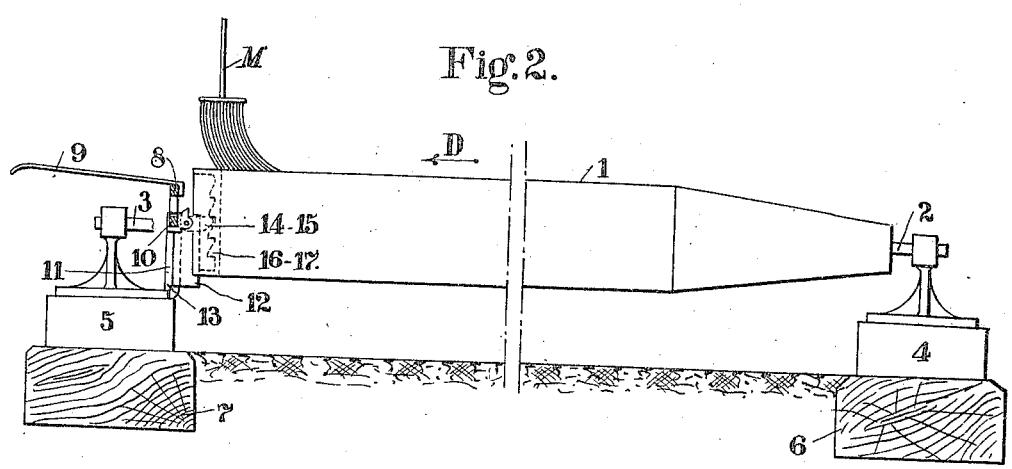
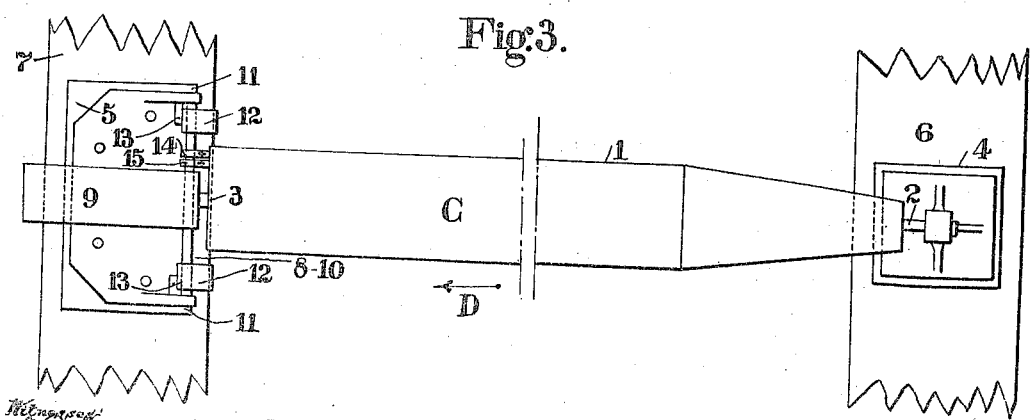

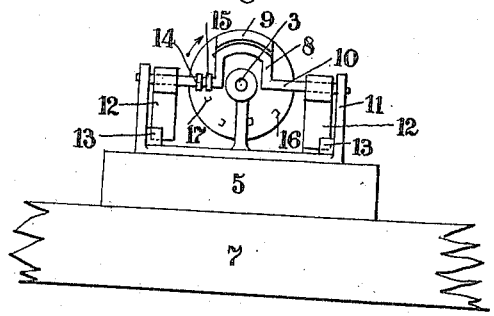
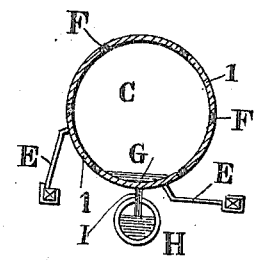
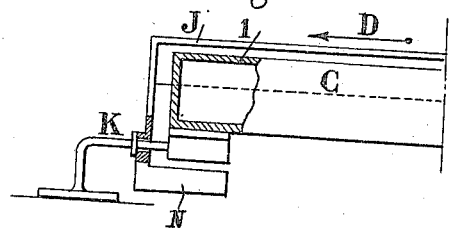
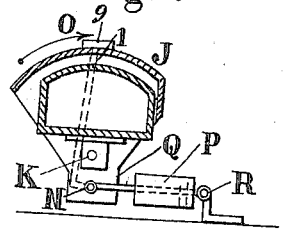
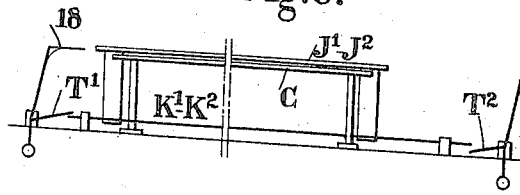
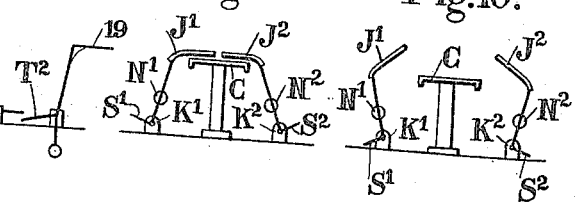

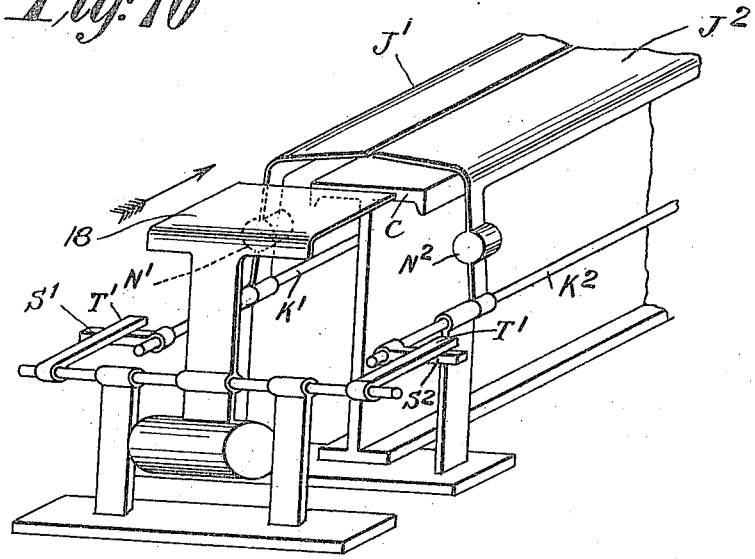
Fig: 10ᵃ
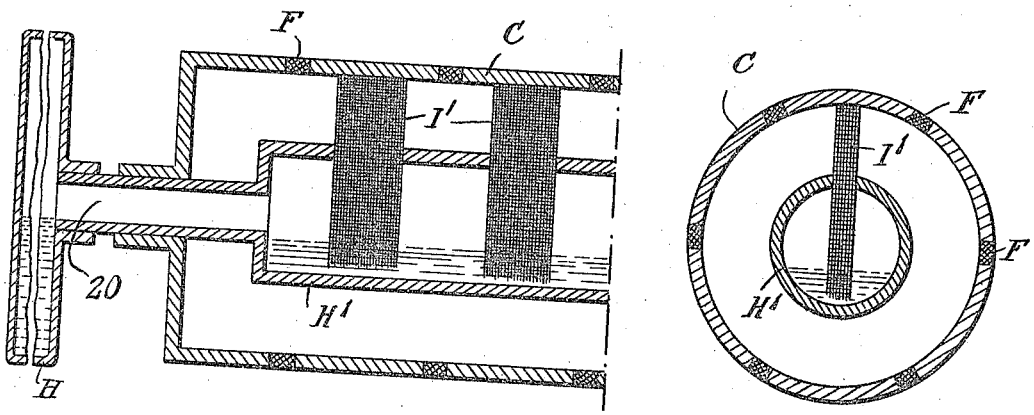
Fig:11.   Fig:12.

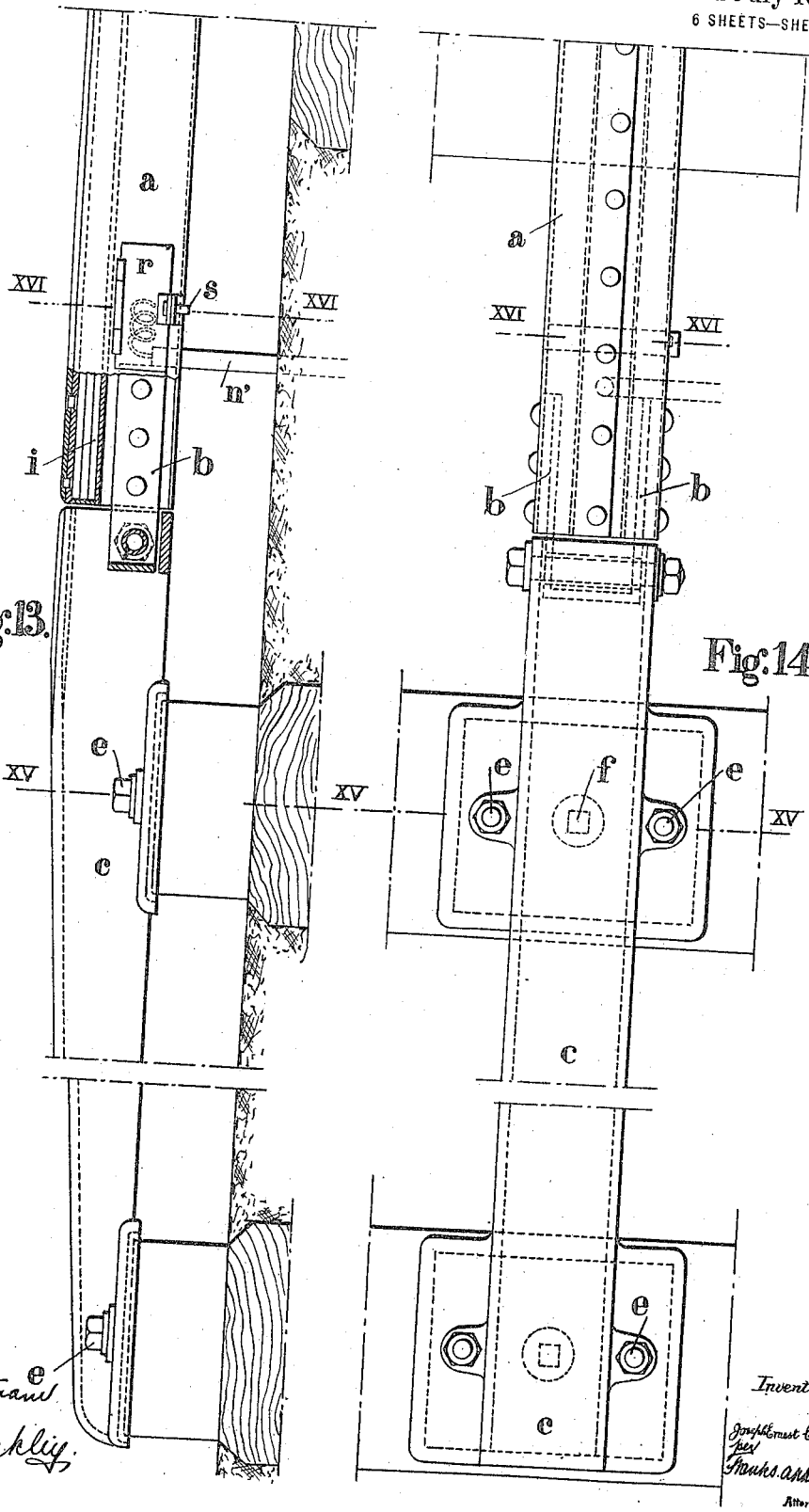

J. E. COLAS.
ELECTRIC SIGNALING APPARATUS FOR RAILWAYS.
APPLICATION FILED DEC. 5, 1913.

1,233,029.

Patented July 10, 1917.
6 SHEETS—SHEET 5.

Inventor
Joseph Ernest Colas

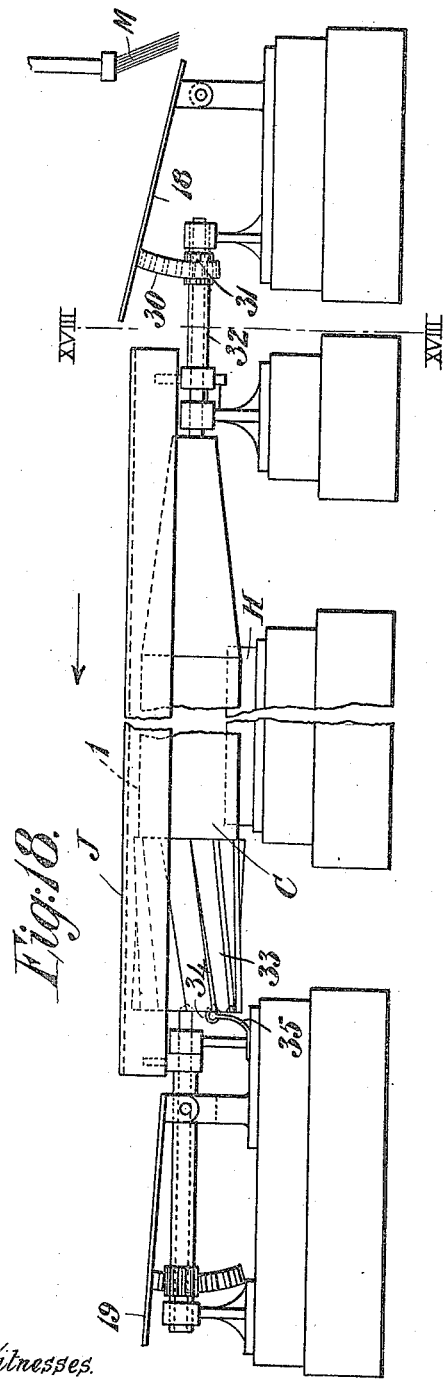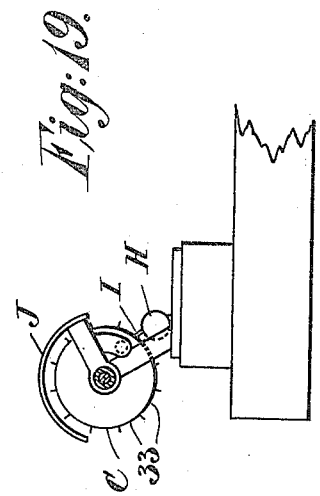

UNITED STATES PATENT OFFICE.

JOSEPH ERNEST COLAS, OF CREIL, FRANCE.

ELECTRIC SIGNALING APPARATUS FOR RAILWAYS.

1,233,029.

Specification of Letters Patent. Patented July 10, 1917.

Application filed December 5, 1913. Serial No. 804,899.

*To all whom it may concern:*

Be it known that I, JOSEPH ERNEST COLAS, a citizen of the French Republic, residing at Creil, Oise, France, have invented a new and useful Improved Electric Signaling Apparatus for Railways, of which the following is a specification.

This invention has for its object improvements relating to contact devices for closing electric circuits. These improvements are especially applicable to contacts which in consequence of their practical application are subjected to atmospheric influences (hoar frost, snow, etc.) as for instance, in the case of electric contacts operated on railway lines.

In accordance with this invention the contact of this type, subjected to atmospheric influence and liable consequently to be covered with a layer of insulating material is so constructed that immediately before it is required to operate, it shall be relieved automatically from the layer of insulating material which may be covering it, or alternatively, it shall be normally protected against the layer by means of a mobile protecting device, which is removed automatically in order to expose the surface of the conductor in question immediately before the entry of the latter into operation, and the protective device is arranged to recover the conductor immediately afterward and automatically, the formation and the adherence of the said insulating layer being moreover resisted by insuring in any convenient manner the production of a coating of fatty matter or of petrol, glycerin or the like upon the outer surface of the contact in question.

In order to facilitate the understanding of this specification, it has been illustrated by way of example in the accompanying drawings as follows:—

Figure 1 shows a diagram in lateral elevation of the combination of an apparatus constructed according to the present invention, and applied to a contact placed upon a railway line, the source of the electric circuit which it is devised to close, being supposed to be carried by a locomotive.

Fig. 2 shows a lateral elevation of the arrangement of the improved contact above described and of its mounting.

Figs. 3 and 4 show plan and front elevation respectively of the aforesaid mechanism.

Fig. 5 shows a transverse sectional elevation of a modification of the contact itself.

Figs. 6 and 7 are respectively side elevation and front elevation of another construction of the improved apparatus in question.

Fig. 8 is a diagrammatic side elevation.

Figs. 9 and 10 diagrammatic end elevations showing alternative positions of a further modified construction in accordance with the invention, while Fig. 10$^a$ is a view in perspective of the lefthand end of Fig. 8.

Figs. 11 and 12 are diagrams showing another modification of the apparatus in question.

Figs. 13 and 14 show part elevation and part plan of a further modification of the apparatus.

Figure 15:
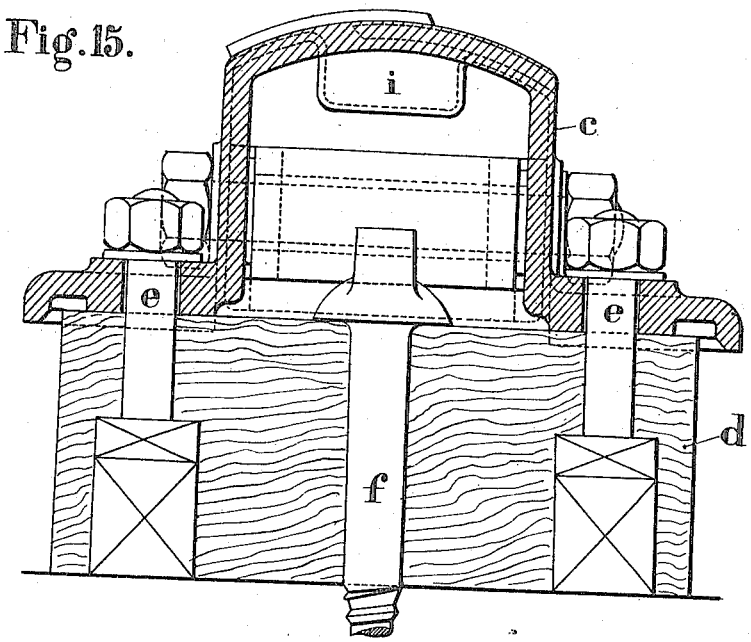
Figure 16:
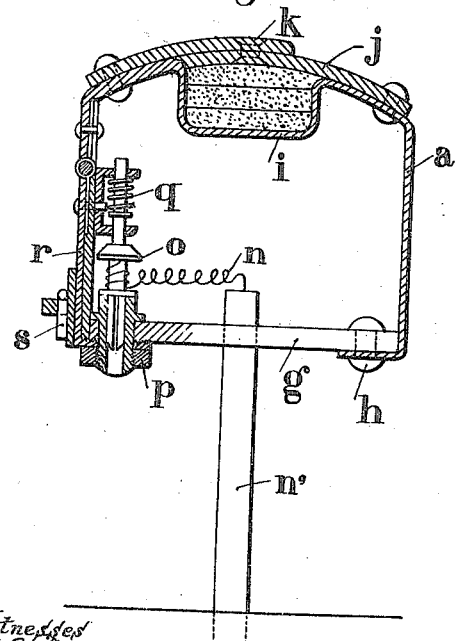

Figs. 15 and 16 show sections on a larger scale respectively on the lines XV—XV and XVI—XVI of Figs. 13 and 14 viewed from left to right.

Figure 17:
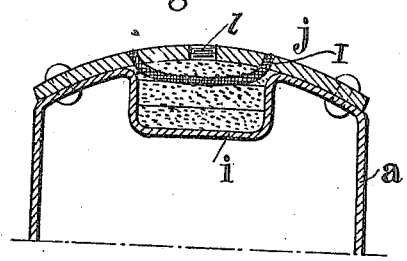

Fig. 17 shows a further modification and

Figs. 18 and 19 are side elevation and section on line XVIII—XVIII respectively of still a further modified construction.

The same letters indicate the same elements in the various figures of the drawing.

In the first example illustrated, it is supposed that C represents a contact arranged on a railway track V and devised to coöperate with another contact M, carried by the locomotive, the same contact M being connected by means of the conductor $C^1$ to one of the terminals of a source of electricity S. The other terminal of this source is supposed to be connected by the conductor $C^2$ to a working apparatus of some kind A, which is again connected to ground by a conductor $m$; consequently when the contact M coöperates with the conducting surface 1 of the contact C the circuit from the source of electricity S is completed through ground traversing the part A. A brush or scraper B, the purpose whereof will be explained hereafter is also fitted upon the locomotive in front of the contact M and at a given distance from this latter, preferably a greater distance than the length of the contact C.

The arrow D indicates the direction followed by the locomotive on the track V.

In the construction illustrated in Figs. 2 to 4 of the accompanying drawing, the contact C is so arranged that it can revolve upon the pivots such as 2 and 3 which are mounted respectively upon supports such as 4 and 5 fixed in any convenient manner upon the sleepers 6, 7 of the track V.

In the construction above set forth, it will be seen that the cylinder forming the contact, preferably rotating, is combined with a piece 8 forming a loop upon which is secured a plate or pedal 9, which can swing upon an axle 10 which is supported in any convenient manner by parts 11 forming bearings for the ends of the axle 10.

On the other hand, there are provided one or more counterweights such as 12 fixed to the axle 10 of the pedal 9. The displacement of these counterweights in their movement in returning to the normal position is moreover limited by stops 13 which insure the return into position of a system of control by catches arranged as follows:—

The loop 8 has two catches or other suitable engagement organs such as 14 and 15, coöperating respectively with one of the two ratchet wheels, one only, 16 of which appears placed for this purpose on the base of the cylinder C.

Under these conditions, the improved system of the present invention will operate as follows:—

When the brush B which is fixed upon the locomotive passes over the pedal 9 it actuates the controlling system of the cylinder C and causes this latter to revolve to a certain amount so that the upper part of its surface which may be covered with hoar frost or otherwise is replaced by the contacting surface. The brush or scraper M which then comes in contact with the said surface then closes with certainty the circuit from the source of electricity S with the working apparatus A.

The system of positive control by means of pedal catches and gearing above described could also be replaced by a system of control by friction involving the construction at the end of the cylinder C of helicoidal grooves of very gentle pitch (see Fig. 18) and which would engage the brush B. There would be produced in this manner the rotation of the cylinder C and consequently the required displacement of its contact surface 1. This is described more in detail hereinafter in connection with Figs. 18 and 19 of the drawings.

Thus, as shown in Fig. 5 of the drawing, any formation of non-conducting coating upon the surface 1 of the contact cylinder can be overcome by coating this surface with a layer of fatty material or of petrol or of glycerin.

For this purpose there may be introduced into the interior of the cylinder C a certain quantity of petrol G, which oozes out through the little orifices F plugged with absorbent material and spreads over the outer surface of the said cylinder. One may also arrange at I under the said cylinder a lubricating and cleansing pad supplied with lubricant from a reservoir H suitably arranged. The lubricating pad in question can be placed upon the track or be formed by the contact brush carried by the locomotive and the brush can in this case be connected to a reservoir containing the lubricant.

Moreover, one can also provide scrapers E or the like coöperating with the surface 1 of the cylinder C and thus dividing up the non-conducting coating into fine particles which are easily detached from the surface of the said cylinder.

In the method of construction illustrated in Figs. 6 and 7 of the drawing, the cylinder C is immovably fixed, but it is combined with a kind of protecting device or apparatus J, which can oscillate upon the axle K so as to uncover and recover automatically at the required moment the upper portion of the surface 1 of the said cylinder or contact C.

The covering motion of J is effected by the passage of the brush B over the pedal 9 in any convenient manner and by means of a counterweight N preferably connected to a dash pot P by means of a rod Q. This dash pot pivoted at R upon a fixed support placed upon the railway track allows the surface 1 of the cylinder C to be uncovered for a sufficient time to permit it to coöperate with the contact M carried by the locomotive. The cover J then closes automatically, revolving in the direction indicated by the arrow O (Fig. 7).

Figs. 8, 9, 10 and 10ª represent a modification of the arrangement of the system of covering device over the upper surface of the contact C above described.

In this modification the protective covering is made in two parts J¹, J² which can respectively oscillate upon the axles K¹, K², and are combined with the retaining weights N¹, N², which according to the position which they occupy in regard to the vertical plane, maintain blinds or screens closed over the upper surface of the contact C or open so as to leave the said surface free.

The motions of these blinds or screens are controlled by two pedals 18, 19 one of which corresponds to the opening of said screens and operates upon their controlling cranks S¹ and S² above, causing the moving apart of the said screens, while the other corresponding to the closure of said screens, operates upon their controlling levers T¹, T² underneath, causing their return over the contact C.

The distance which separates the contact pedals must be so calculated that the contact M may always encounter the conducting surface of the contact C at the required moment.

In order to insure the distribution over the outer surface 1 of the contact cylinder C of the layer of fatty matter above mentioned which is intended to prevent formation of frost or the like and to diminish its adherence, one may also employ the arrangement shown in Figs. 11 and 12 of the drawing.

In this arrangement, there is provided in the interior of the cylinder C a concentric receptacle H' communicating at its ends 20 with a receptacle H and which serves to supply the lubricant; wicks such as I' insure the distribution of the lubricant over the internal surface of the contact C and from thence through the little holes or orifices F plugged with absorbent material its distribution over the outer surface of said cylinder.

Obviously, the hollow ends 20 of the reservoir H' will be preferably utilized as supports for the contact cylinder C in which the rotary motion will be controlled by the above described mechanisms:—

The invention described is moreover capable of further modification for the purpose of simplifying its construction and of rendering more certain the results aimed at.

Referring to Figs. 13 to 17 of the drawing, there is illustrated a construction of the contact device by means of a bar $a$ of suitable length formed of cast or wrought iron supported at both ends by means of shackles $b$ screwed or bolted on the projecting castings $c$ which permit of the brush or scraper carried by the locomotive mounting on it without a jerk, these projecting parts being attached by means of bolts $e$ or otherwise on the parts $d$ which are themselves fixed by means of the screws $f$ to the sleepers.

The part $a$ which constitutes the essential element of the contact is made of cast or of wrought iron and is supported at a given distance above the track and can be left open at its lower part, which is, in this case held by means of rigid bars $g$ secured by means of rivets $h$ or otherwise to the body of the piece $a$. At the upper part of this latter there is provided a little receptacle $i$ closed by means of a cover $j$ made in two or more pieces which may be joined together by means of rivets $k$ (Fig. 16) or in a single piece in which there are then formed openings $l$ which can be closed by means of screw plugs (Fig. 17). In this receptacle $i$ are placed layers of absorbent material which are maintained soaked with petrol or glycerin or with some fatty body which can exude to the exterior even through capillary orifices such as are formed by the joinings of the sheets held by means of the rivets $k$ as shown in Fig. 16, or through the orifices $l$ closed by screw or plugs as shown in Fig. 17. In order to make sure of its exudation and to increase its amount if necessary, there may be interposed between the sheets a wick I of suitable thickness dipping into the receptacle $i$, as shown in Fig. 17.

The contact $a$ is put into communication with earth by means of a conductor $n$, $n'$. The wire $n$ forming one of the elements of this conductor is coiled upon a terminal $o$ mounted upon the part $p$ fixed on one of the bars $g$. In order to insure the absolute contact of the part $o$ with $p$ there is arranged above this part a little spring push $q$ which serves to keep the terminal pressed upon its seating. A hinged door $r$ kept closed by means of the bolt $s$ permits of easy access to the interior of the part $a$ whenever it is needful to repair a defective contact.

In Figs. 18 and 19 an embodiment is illustrated in which a rotary contact cylinder is combined with an oscillatory cover and with means for producing a film of lubricant upon the conductor. In these figures the brush M serves both as a contact brush, as in Fig. 1, and as the operating brush for rotating the cylinder and oscillating the shutter. Two pedals 18 and 19, similar to those shown in Fig. 8 are employed. The arrow shows the direction of travel of the locomotive. The pedal 18 is first depressed, and by means of a crank $T^1$ acting on a crank $S^1$ the cover or shutter J is withdrawn from the top of the signaling rail owing to the oscillation of the shaft $K^1$. This action is the same as described in connection with Figs. 8 to $10^a$. The signal cylinder or conducting cylinder C is now exposed and the brush M comes into contact with the cylinder C upon the surface 1 as described in connection with Fig. 2. At the opposite end of the cylinder, however, the latter is provided with helical grooves 33 of gentle pitch. The brush M enters one of these and during its axial passage rotates the cylinder C a definite amount. As shown in the drawing, this is equal to one-twelfth of a revolution and a fresh contact surface is presented to the brush upon the next locomotive to pass. The cylinder C is retained in its new position by means of a ball stop 34 pressed by a spring 35. The brush M then breaks contact with the cylinder C and strikes the pedal 19. By cranks $T^2$ and $S^2$ the cover J, which is similar to that shown in Fig. 7, is restored to the covering position over the cylinder C. Both the pedals 18 and 19 are provided with counterweights $W^1$ and $W^2$ as shown in Figs. 8 and $10^a$. The central portion of the cylinder C is provided with lubricating rings exactly of the type shown in Fig. 5. There is an oil reservoir H with wicks I for spreading a film of lubricant over the surface of the cylinder C.

What I claim is:

1. In apparatus for electrical signaling on railways, a conducting signaling rail parallel to the running rails, supports maintaining said signaling rail in position upon the sleepers, an apparatus upon a locomotive adapted to come into electrical connection with said signaling rail while the locomotive travels over the adjacent running rails, means upon said locomotive for partially rotating said signaling rail, a shutter normally covering said signaling rail, but removed upon the approach of the locomotive and restored after the passage of the latter, and means for spreading a film of lubricant over the outside surface of said signaling rail.

2. In apparatus for electric signaling on railways, a cylindrical, rotatable, metal bar adapted to transmit electric current, supports upholding said bar, on the sleepers and parallel to the railway rails, means operable by a passing locomotive for rotating said bar, apparatus on said locomotive arranged to come into electrical contact with the said bar while the locomotive travels over the adjacent rails, and a fixed scrubbing device for removing any insulating coating from the surface of said bar during rotation of the latter.

3. In apparatus for electric signaling on railways, a cylindrical metal bar adapted to transmit electric current and placed parallel to the track, supports upholding said bar at each end, mechanism for partly rotating the said bar during the transmission of the electric current, apparatus on a locomotive arranged to come into electrical contact with the said bar while the locomotive travels over the adjacent rails, and a scrubbing device for removing any insulating coating from the surface of said bar.

4. In apparatus for electric signaling on railways, a cylindrical metal bar adapted to transmit electric current and placed parallel to the track, supports upholding said bar at each end, mechanism for partly rotating the said bar during the transmission of the electric current, means for lubricating the outside of said bar, apparatus on a locomotive arranged to come into electrical contact with the said bar while the locomotive travels over the adjacent rails, and means for removing any insulating coating from the surface of said bar.

5. In apparatus for electrical signaling on railways, the combination of a conductive signaling rail supported parallel to the track rails, a rocking cover normally covering said signaling rail but removed upon the approach of the locomotive, a pedal located in position to be depressed by the locomotive and arranged on the side of the conducting rail from which the locomotive approaches, connections between said pedal and said cover for removing the latter upon depression of the pedal, a second pedal arranged at the opposite end of said signaling rail but located in the path of the locomotive to be depressed thereby, and connections between said pedal and said cover for restoring said cover to its normal position after the passage of the locomotive, and apparatus upon the locomotive for making electrical contact with said signaling rail during the period the locomotive travels over the adjacent track rails.

6. In apparatus for electric signaling on railways, a cylindrical metal bar adapted to transmit electric current, a cover adapted to cover or uncover said bar, supports upholding said bar on the sleepers and parallel to the railway rails, apparatus on a locomotive arranged to come into electrical contact with the said bar while the locomotive travels over the adjacent rails, a scrubbing device for removing any insulating coating from the surface of said bar and means for spreading a film of lubricant over the outside surface of said bar.

7. In apparatus for electrical signaling on railways, the combination of a conducting signaling rail parallel to the running rails, means for supporting said signaling rail in position upon the sleepers, a reservoir of lubricant supported upon said apparatus, and means for conducting said lubricant in thin films upon the surface of said signaling rail.

In testimony whereof I have signed my name to this specification in the presence of two subscribing witnesses.

JOSEPH ERNEST COLAS.

Witnesses:
HANSON C. COXE,
JACK H. BAKER.

Copies of this patent may be obtained for five cents each, by addressing the "Commissioner of Patents, Washington, D. C."